United States Patent [19]

Ashley

[11] Patent Number: 5,152,594

[45] Date of Patent: Oct. 6, 1992

[54] TUBE BASE NOTCHER

[75] Inventor: Richard F. Ashley, Twin Lakes, Mich.

[73] Assignee: Meridian Incorporated, Spring Lake, Mich.

[21] Appl. No.: 625,090

[22] Filed: Dec. 10, 1990

[51] Int. Cl.$^5$ ............................................. A47B 95/00
[52] U.S. Cl. ................................. 312/270.1; 403/401; 403/205; 52/658
[58] Field of Search ................ 403/401, 402, 403, 205; 52/658, 657; 312/254, 406.2, 265.1, 258, 265.4, 253, 254, 278

[56] References Cited

U.S. PATENT DOCUMENTS

| | | | |
|---|---|---|---|
| 1,615,823 | 2/1927 | Barclay | 52/658 |
| 2,462,199 | 2/1949 | Kehoe et al. | 52/658 |
| 2,535,528 | 12/1950 | Brodeck | 312/253 |
| 3,097,684 | 7/1963 | Le Tarte | 153/2 |
| 4,073,177 | 2/1978 | Leroux | 72/339 |
| 4,577,915 | 3/1986 | Nishida et al. | 312/406.2 |

Primary Examiner—Gerald A. Anderson
Attorney, Agent, or Firm—Reising, Ethington, Barnard, Perry & Milton

[57] ABSTRACT

A base (10) and the method for fabricating the corners (32) of the base (10) of a piece of furniture (12) from tubing (18) by notching the tube (18). The notching removes a metal from the tube (18) along the first pair of extremities (40) converging to an apex (44), and along a second pair of transverse extremities (52). Additional material is removed from the space (32) by removing a plug from the tube (18) adjacent the apex (44) in the shape of a bowl having two parallel sides (56), a third side (58) perpendicular thereto and a point (44). The tube (18) is folded at each point (44) creating corners (32) and an enlarged relief space (46) therebetween to allow fluids used in the post-fabrication operations, i.e., washing and painting, to flow quickly therefrom thus increasing drying times. The gussets (52) are welded to the tube (18) to add strength to the base (10).

3 Claims, 3 Drawing Sheets

TUBE BASE NOTCHER

BACKGROUND OF THE INVENTION

1. Technical Field

The subject invention relates to office furniture having a polygonal base and a storage area fixedly secured thereto. More particularly, the subject invention relates to the base configuration and the method of fabricating same from a single metallic tube in a manner which decreases the post-fabrication finishing times.

2. Description of Related Art

Makers of metallic furniture for offices have assembly problems when producing the base portion of the furniture. Each base, typically rectangular, comprises four individual pieces of metal which must be welded at each corner and then ground smooth. This process is labor and time intensive and, therefore, costly. Additionally, the time needed to dry the base after the washing and painting steps of production is extensive.

Another problem related to the current method of producing a base in this fashion is the inventory which must be kept to produce bases. Each type of base produced has two different sizes of tube that must be kept in stock. This can be costly because money and valuable storage space are needed to keep the inventory at the proper levels.

U.S. Pat. No. 3,097,684 to Le Tarte, issued Jul. 16, 1963 discloses a method of forming a closed corner in a hollow rectangular metal work piece. More particularly, this patent discloses a method of operating a pair of saws relative to each other used to cut a portion of metal out of a rectangular tube. This patent does not, however, disclose a method for forming a polygonal base out of one piece of rectangular tubing which also reduces the time it takes to dry the base after post-fabrication operations, i.e., washing and painting the base.

U.S. Pat. No. 4,073,177 to Leroux, issued Feb. 14, 1978 discloses a method for bending a thick metallic elongated part having a profile resembling one of the letters U, V, or W. More particularly, this patent discloses a process of cutting a thick metallic part by cutting the metallic part in two places, each cut is cut at an angle wherein the sum of the angles equals the angle desired for the bend of the elongated part. The elongated part is also cut in a direction parallel to the longitudinal axis of the elongated part between the innermost points of the two angled cuts. This allows the elongated part to be bent at the desired angle without accumulating excess material at the newly formed corner. Again, this method is deficient because it does not disclose any steps taken to increase the speed in which these newly formed frames dry from post-fabrication operation.

SUMMARY OF THE INVENTION AND ADVANTAGES

A storage assembly is disclosed comprising a housing defining an enclosure and a base for supporting the housing. The base comprises a tube having a cross-section with four sides and extends through a rectangle. Each of the corners of the base has a notch wherein the notch opens inwardly, toward the center of the base. The subject invention overcomes the deficiencies of the prior art by notching the corners to provide a space at each corner. These spaces allow the tube to be bent without having material gather at the corners in addition to allowing post-fabrication fluids, i.e., soapy water, paint, to flow quickly therefrom, thus increasing production.

FIGURES IN THE DRAWINGS

Other advantages of the present invention will be readily appreciated as the same becomes better understood with reference to the following description when considered in connection with the accompanying drawings wherein.

DETAILED DESCRIPTION OF THE PREFERRED EMBODIMENT

Figure 1:
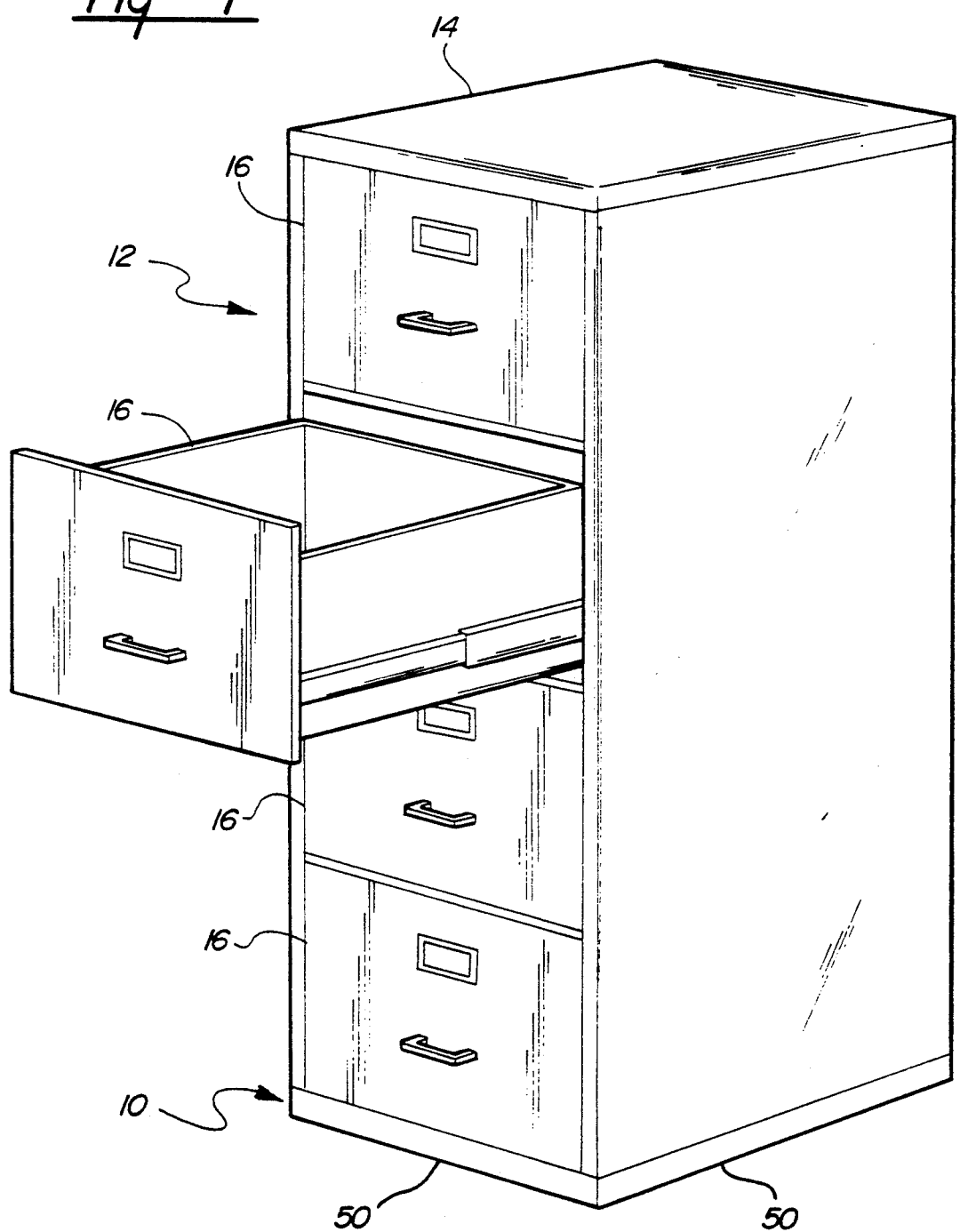
FIG. 1 is a perspective view of a piece of office furniture using the base produced by the subject method.
Figure 2:
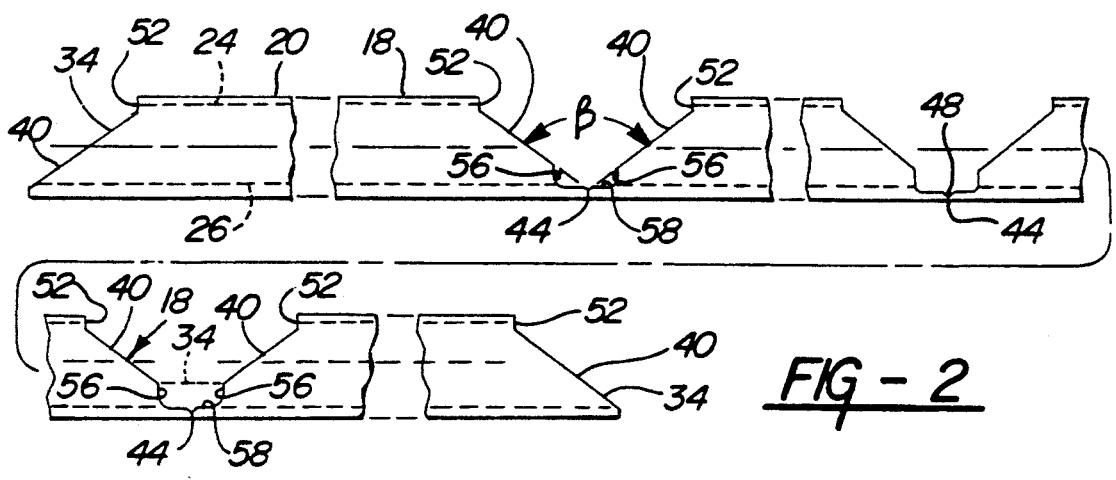
FIG. 2 is a plan view of the rectangular tube partially cut away showing the notch and scribe portions.
Figure 4:
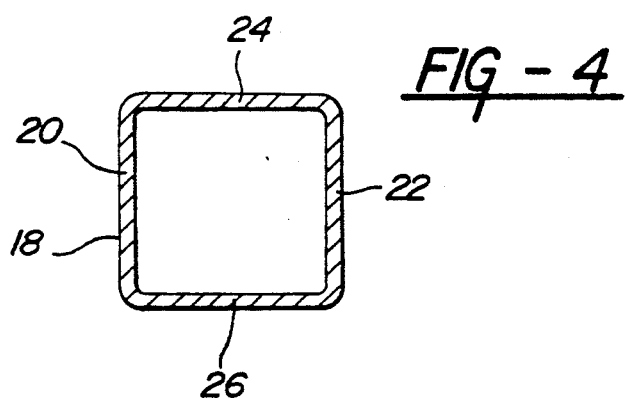
FIG. 4 is a cross-sectional view of the tube taken along line 4—4 of FIG. 3.
Figure 5:
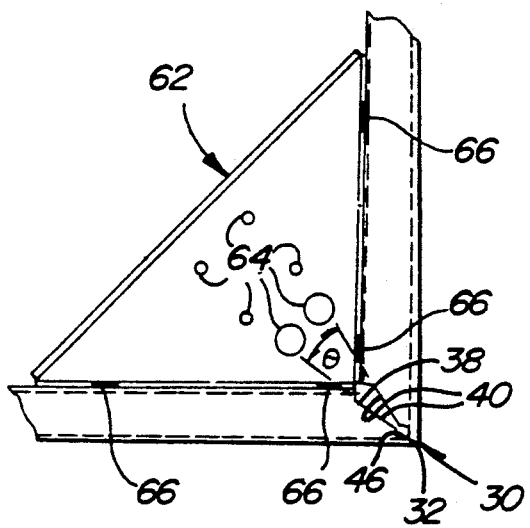
FIG. 5 is an enlarged fragmentary view of the corner shown in the circle of FIG. 3.

The subject invention is a base for a piece of furniture and it is generally shown at 10 in the Figures. The base 10 is best suited for furniture that is designed to store items therein. Such a storage assembly, generally shown at 12, is shown as file cabinet with which the base 10 will be incorporated. The storage assembly 12 comprises a housing 14. The housing 14 defines an enclosure wherein items will be stored. The housing 14 is divided into a plurality of storage units 16, each is movably between a closed condition and an open condition. As may be seen in FIG. 1, the storage units 16 are drawers of a filing cabinet 12 and the drawers are movable between a closed position and an open position. It will be understood, however, that the base 10 may be used to support any type of storage assembly and the use of the file cabinet in the Figures is for illustrative purposes only.

The base 10 comprises a tube and is generally indicated at 18. The tube 18 is hollow and has a cross-section with four sides. In the preferred embodiment, the cross-section is a square. The tube 18 comprises opposite sides 20, 22 and sides 24, 26 adjacent thereto. The four sides 20, 22, 24, 26 necessarily define four ninety degree angles in the hollow interior of the tube 18.

The tube 18 is extended through a rectangle generally indicated at 28. The rectangle comprises four corners, generally indicated at 30. The tube 18 is bent at three distinct locations to create three 32 of these corners 30 and the two ends 34 of the tube 18 meet to create the fourth corner 36.

The base 10 is characterized by having each of the three corners 32 having notches in the opposite or top and bottom sides 20, 22 of the tube 18 on the interior thereof to define a space between the adjacent opposite sides 24, 26. The space, generally indicated at 38, prevents the gathering of material at the corners 30 when the tube 18 is bent to create the corners 30.

The space 38 between the adjacent opposite sides 24, 26 is defined by a first pair of extremities 40 which converge from the outside of each of the three corners 32. In other words, the width of the spaces 38 is proportional to the distance from the corner 32 as one moves toward the inside of the corners 30 or, alternatively, toward the interior 42 of the base 10. The first pair of extremities 40, which diverge toward the interior 42 of the base 10, converge to an apex 44 adjacent each of the corners 30. The three corners 32 further include an enlarged relief space or hole 46 adjacent each apex 44 of the extremities 40. In addition, the enlarges relief spaces 46 are adjacent the inside of each of the three corners 32. The enlarged relief spaces 46 provide additional space which are void of material. The enlarged relief spaces 46 further provide drainage for post-fabrication fluids when the base 10 is in the finishing stages of production.

The base 10 further includes a cut 48 extending toward the inside of each of the three corners 32. This cut 48 extends from the adjacent enlarged release 46 and is used to divide the adjacent opposite sides 24, 26. The cut 48 in effect concentrates stresses at the center of each space 38 or notch 38 thus ensuring the tube 18 will be bent exactly at the cut 48. In other words, the lengths of the sides 50 of the base 10 may be accurately made without additional measuring devices because of the stress applied to the tube 18 to produce a base 10 will always be relieved at positions in the tube 18 where the cuts 48 exist. The cuts 48 also provide for sharp corners 32 with minimal rounding at the corners 32. Each of the corners 32 have a distinct point and do not extend over a finite length of tubing 18. The cuts 48 allow for the creation of the sharp corners 32 without adding additional width to the tubing, i.e., there is no accumulation of material at the corners 32. Therefore, the storage assembly 12 will contact the base 10 at every point of the base 10 and not merely at the corners 32 where accumulating material would separate the storage assembly 12 from the rest of the base 10.

The spaces 38 further include a second pair of extremities 52 which extend transversely into the spaces 38 and are perpendicular to each other in the formed position. The second pair of extremities 52 extends perpendicularly from the outside of each of the corners 30 to meet with the first pair of extremities 40 at the widest space therebetween. Therefore, after the width of the spaces 38 increase, the width begins to decrease. The width, however, does not decrease to zero. In other words, the outer most portions of the spaces 38 never touch each other and the periphery of each of the spaces 38 is open.

The first step in the method of producing the base 10 is positioning the tube 18. The tube 18 must be positioned accurately to reduce the amount of wasted tube 18 or scrap that may occur in the subsequent steps.

The tube 18 is then notched along the length of the tube 18 for creating a notch or space 38 through the tube 18 defining a notch angle beta with the apex 44 in the tube 18. The angle beta is just more than ninety degrees. The tube 18 is then folded at the notch 38. This creates a corner 32 having a corner angle alpha α less than the notched angle beta β. In the four sided base this corner angle alpha α is ninety degrees.

The method for producing the base 10 is characterized by removing a plug from the interior of the opposites sides 20, 22 immediately adjacent the apex 44 for providing an enlarged relief space or hole 46 adjacent the apex 44 of the three corners 32.

The method is further characterized by forming the notched angle beta β greater than ninety degrees and generally less than one hundred thirty five degrees. The notched angle beta β must be greater than ninety degrees to provide for the space 38. The angle theta θ, defined by the extremities 40 as equal to the notched angle beta β after the corner angle alpha α has been subtracted therefrom.

The plug which is removed from each of the three corners 32 is generally bowl shaped having two parallel sides 56 which are rounded into a third side 58 perpendicular thereto. A point 44 is cut into the middle of the enlarges relief space 46 created by the cut 48. This point 44 is located adjacent the third side 58 of the plug. The perpendicular extremities 52 are notched in the tube 18. These two perpendicular extremities 52 extend into the tube 18 to join the extremities 40 which define the notched angle beta β. The adjacent opposite side 26 is completely severed between the two perpendicular extremities 52.

The second step of the method comprises folding the tube 18 with the perpendicular extremities 52 perpendicular to each other and with the extremities 40 defining a notch angle theta θ being spaced from one another at an acute angle extending to the enlarged relief space 46 defined by the plug adjacent the apex 44 of the corner 32. The notch angle theta θ is necessarily greater than zero degrees and less than ninety degrees. That is, the tube 18 is folded to create a rectangular space 10 and not to have either the first pair of extremities 40 or the second pair of extremities 52 touch. This would eliminate the spaces 38 and inhibit the drainage of post-fabrication fluids.

Figure 3:
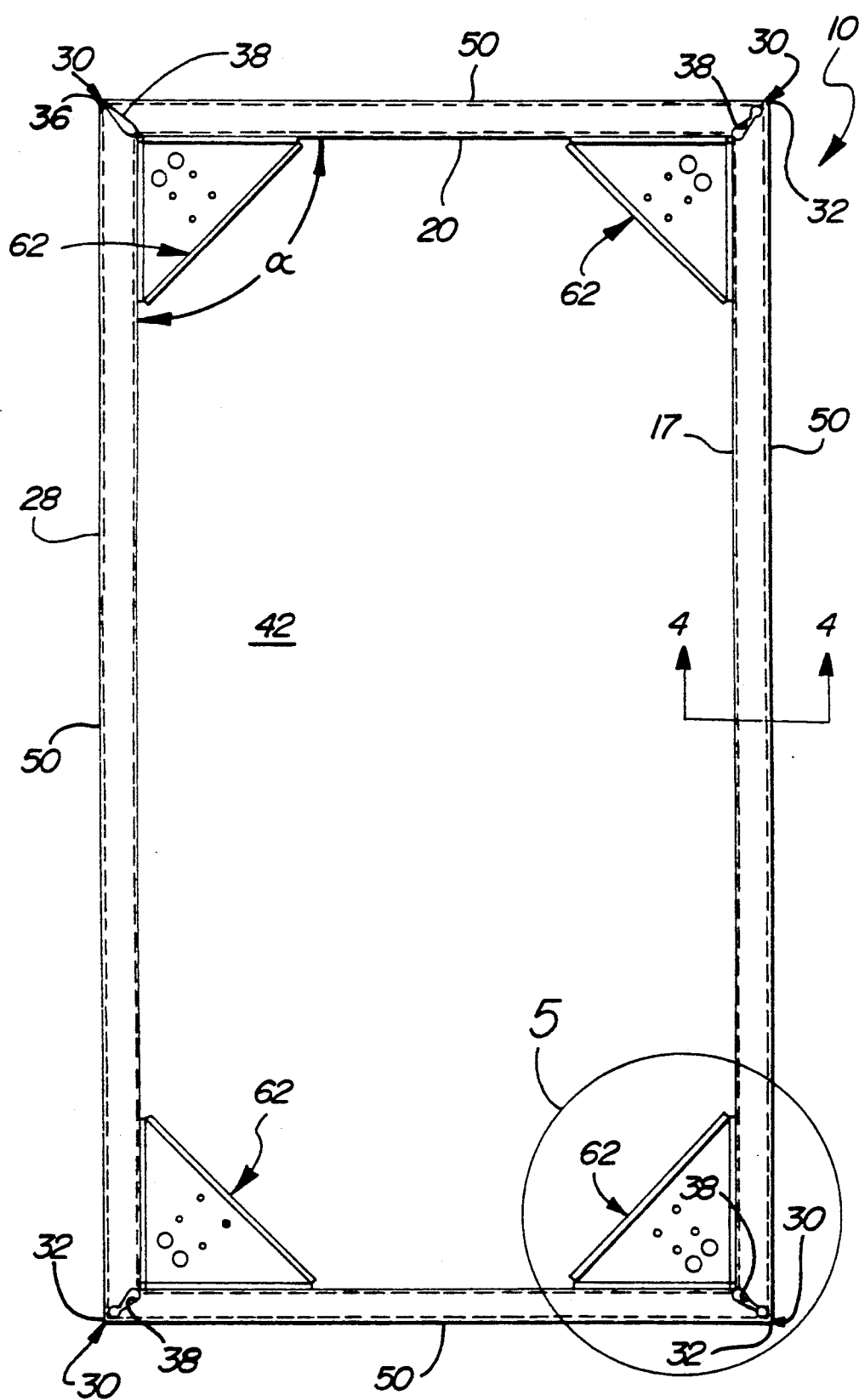
FIG. 3 is a plan view of the finished base.

The third and final step of the method is supporting the tube 18 on either side of each of the corners 30. As may be seen at FIG. 3, gussets 62 having holes 64 are welded to the base 10 at weld points 66.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A storage assembly (12) comprising:
    a housing (14) defining an enclosure;
    a base (10) defining an interior (42) for supporting said housing (14);
    said base (10) comprising a tube (18) having a cross-section with four sides (50), said tube (18) being bent to form a rectangle having corners (30);
    each of said corners (30) having notches in opposite sides (20,22) on said interior (42) thereof to define a space (38) between adjacent opposite sides (24,26) thereby preventing the gathering of material at said corners (30), said space (38) between adjacent opposite sides (24,26) being defined by extremities (40) which converge from the inside of each corner (30) to an apex (44) adjacent the outside thereof, said assembly characterized by
    an enlarged relief space (46) adjacent said apex (44) of said converging extremities (40) and immediately adjacent each of said corners (30).

2. An assembly (10) as set forth in claim 1 further characterized by including a cut extending toward the outside of each corner (30) from the adjacent relief space (46) to divide said adjacent opposite sides (24,26).

3. An assembly (10) as set forth in claim 2 further characterized by each of said spaces (38) having perpendicular extremities (52) extending thereinto from the inside of each of said corners (30) to meet with said diverging extremities (40) at the widest space therebetween.

* * * * *